United States Patent
Vidyadhara et al.

(10) Patent No.: US 11,726,880 B1
(45) Date of Patent: Aug. 15, 2023

(54) FAULT TOLERANCE AND DEBUG ANALYSIS DURING A BOOT PROCESS

(71) Applicant: Dell Products L.P., Round Rock, TX (US)

(72) Inventors: Sumanth Vidyadhara, Bangalore (IN); Karunakar Poosapalli, District Medak (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/675,215

(22) Filed: Feb. 18, 2022

(51) Int. Cl.
*G06F 11/14* (2006.01)
*G06F 9/4401* (2018.01)

(52) U.S. Cl.
CPC ........ *G06F 11/1417* (2013.01); *G06F 9/4403* (2013.01); *G06F 2201/805* (2013.01)

(58) Field of Classification Search
CPC ............... G06F 11/1417; G06F 9/4403; G06F 2201/805
See application file for complete search history.

(56) References Cited

U.S. PATENT DOCUMENTS

| | | | |
|---|---|---|---|
| 10,146,606 | B2 | 12/2018 | Onniyil et al. |
| 10,853,087 | B2 * | 12/2020 | Khatri ................... G06F 9/4416 |
| 10,916,326 | B1 | 2/2021 | Holmberg, Jr. et al. |
| 11,144,328 | B2 | 10/2021 | Suryanarayana et al. |
| 11,550,592 | B2 * | 1/2023 | Kotary ................. G06F 9/4401 |
| 2004/0221150 | A1 * | 11/2004 | Maynard ............... G06F 9/4403 |
| | | | 713/2 |
| 2005/0149711 | A1 * | 7/2005 | Zimmer ................ G06F 9/4812 |
| | | | 712/244 |
| 2010/0313061 | A1 * | 12/2010 | Huth ...................... G06F 9/3861 |
| | | | 711/170 |
| 2017/0149920 | A1 * | 5/2017 | Sammatshetti .......... G06F 3/061 |
| 2018/0165101 | A1 * | 6/2018 | Bulusu ................ G06F 11/1438 |
| 2018/0284989 | A1 * | 10/2018 | Kachare .................. G06F 13/28 |
| 2019/0187909 | A1 * | 6/2019 | Pinto ...................... H04L 49/351 |
| 2019/0228145 | A1 * | 7/2019 | Shanbhogue ......... G06F 3/0673 |
| 2019/0340058 | A1 * | 11/2019 | Sasidharan ........... G06F 11/079 |
| 2020/0034237 | A1 * | 1/2020 | Suryanarayand ..... G06F 11/073 |
| 2020/0257521 | A1 * | 8/2020 | Jayakumar ............ G06F 9/4401 |
| 2020/0310774 | A1 * | 10/2020 | Zhu ........................ G06F 9/4401 |
| 2020/0394303 | A1 * | 12/2020 | Suryanarayana ..... G06F 21/572 |
| 2021/0141903 | A1 * | 5/2021 | Jayakumar ............ G06F 21/575 |
| 2021/0240488 | A1 * | 8/2021 | Suryanarayana ..... G06F 9/4406 |
| 2021/0326142 | A1 * | 10/2021 | Banik .................... G06F 9/4403 |
| 2022/0197746 | A1 * | 6/2022 | Chu ........................... G06F 8/65 |

FOREIGN PATENT DOCUMENTS

EP 3901768 A1 * 10/2021 ......... G06F 12/0802

* cited by examiner

Primary Examiner — Matthew M Kim
Assistant Examiner — Indranil Chowdhury
(74) Attorney, Agent, or Firm — Larson Newman, LLP

(57) ABSTRACT

An information handling system may detect an exception, create a hand-off block in an NVMe boot partition in an NVMe device during a pre-extensible firmware interface phase of a boot process, and update the hand-off block with information associated with the exception. The system may also load an exception table to the NVMe boot partition, wherein the exception table includes an index associated with the exception that is mapped to a vector associated with an exception handler, and load the exception handler to the NVMe boot partition, wherein the exception handler resolves the exception.

20 Claims, 8 Drawing Sheets

FAULT TOLERANCE AND DEBUG ANALYSIS DURING A BOOT PROCESS

FIELD OF THE DISCLOSURE

The present disclosure generally relates to information handling systems, and more particularly relates to fault tolerance and debug analysis during a boot process.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may detect an exception, create a hand-off block in an NVMe boot partition of an NVMe device during a pre-extensible firmware interface phase of a boot process, and update the hand-off block with information associated with the exception. The system may also load an exception table to the NVMe boot partition, wherein the exception table includes an index associated with the exception that is mapped to a vector associated with an exception handler, and load the exception handler to the NVMe boot partition, wherein the exception handler resolves the exception.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
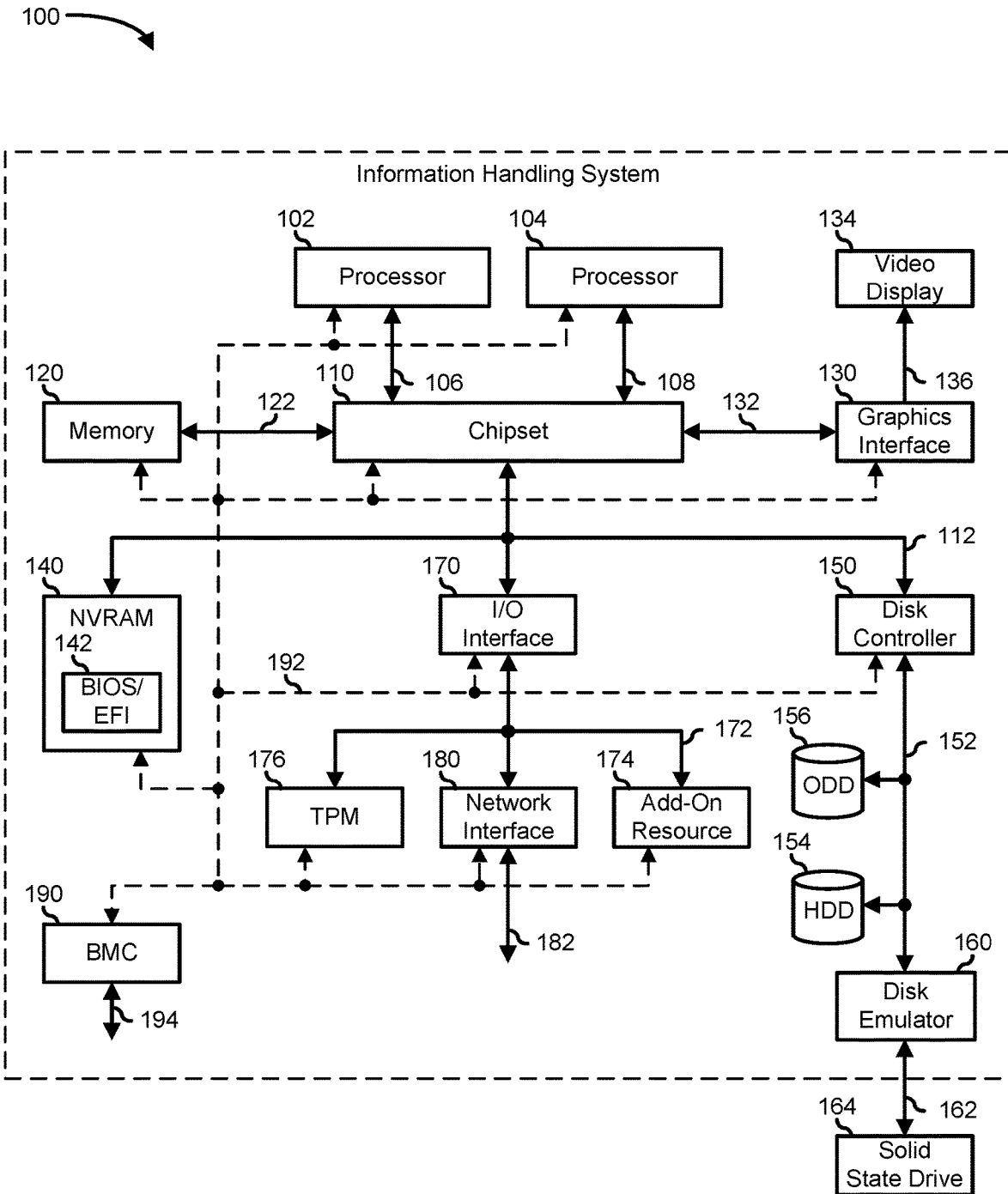
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

The BIOS is the first firmware that is executed on the processor when an information handling system is powered on. The primary task of the BIOS is to initialize the hardware and load the operating system. During the early phase of the boot process, access to BIOS firmware, unified extensible firmware interface (UEFI), and/or software routines/protocols is typically restricted. Analysis of exceptions during the early phase of the boot process is typically not handled. For example, if an error occurs during the early phase of the boot process before memory is detected, the boot process may result in a catastrophic failure. To address these and other concerns, the present disclosure enables fault tolerance and debug analysis during the boot process. In particular, the present disclosure includes a system and method for dynamic analysis of the exceptions during the early phase of the boot process even before the system memory has been initialized. Information associated with the exceptions may also be stored at a remote telemetry server for later analysis.

Figure 2:
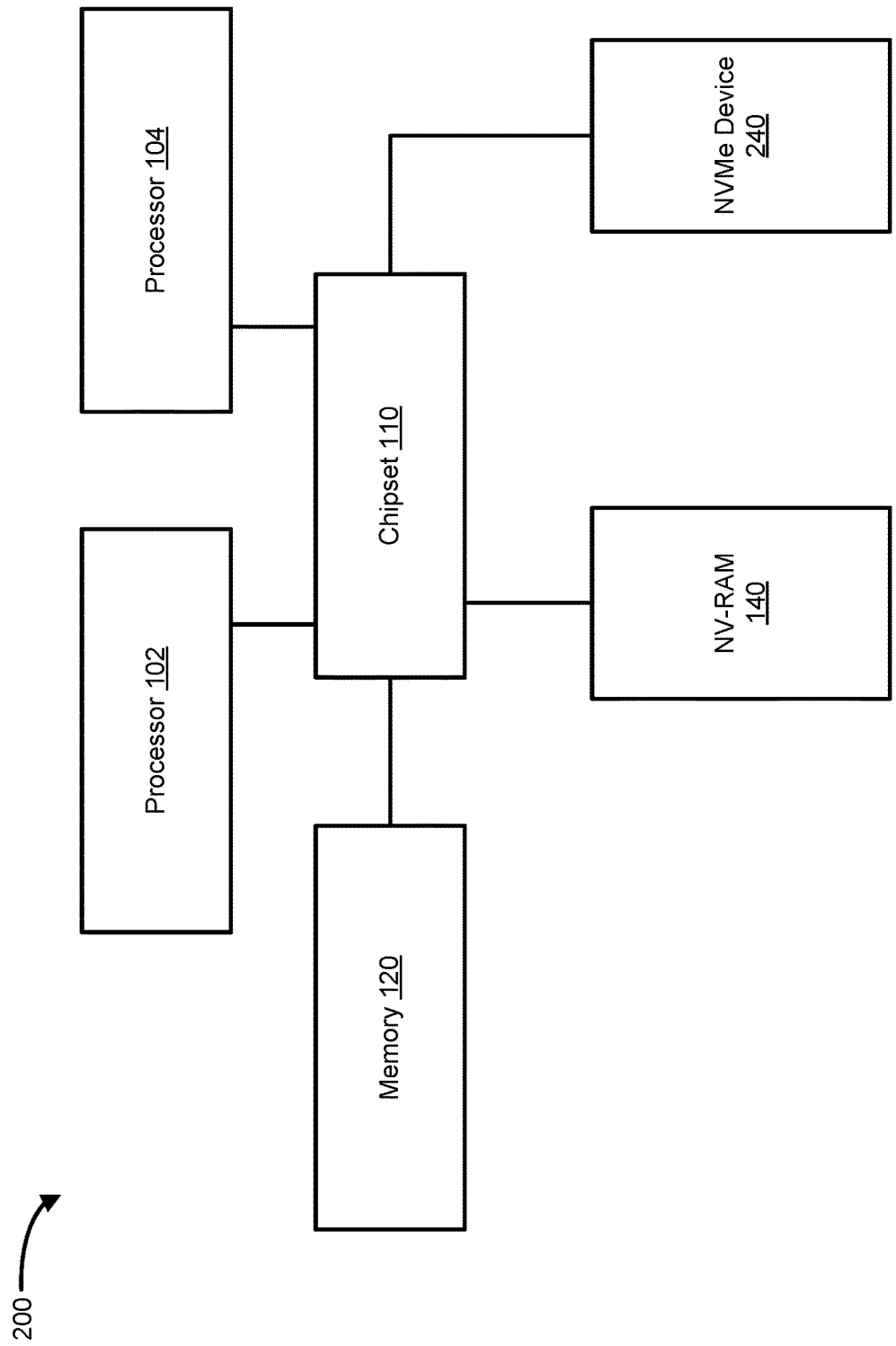
FIG. 2 is a block diagram illustrating an example of a platform architecture that may exist on an information handling system for fault tolerance and debug analysis during a boot process, according to an embodiment of the present disclosure.

FIG. 2 shows an example of a platform architecture that may exist on an information handling system 200, which is similar to information handling system 100 of FIG. 1, for fault tolerance and debug analysis during a boot process. Information handling system 200 includes a non-volatile memory express (NVMe) device 240, NV-RAM 140, memory 120, processor 102, processor 104, and chipset 110. NVMe device 240 may be an SSD storage device such as an NVMe PCIe add-in card, an NVMe M.2 card, etc. One of a skill in the art will recognize that other types of storage devices with similar functionality as the NVMe device 240 such as a flash storage, a memory device, an HDD, or an ODD may be provided according to the teachings of the present disclosure and thus will fall within its scope as well.

Chipset 110 provides a way for one or more processors to interface with NVMe device 240, processor 102, processor 104, and memory 120. In one example, NV-RAM 140 is connected to chipset 110 via a serial peripheral interface (SPI) and NVMe device 240 via PCIe and an SMBus. In one embodiment, information handling system 200 may be configured to enable dynamic detection of an NVMe boot partition as part of the system memory, wherein the NVMe boot partition may hold exception handlers even before the system memory is installed. As used herein, the exception handler includes an interrupt service routine also referred to as an interrupt handler. In particular, the NVMe and a memory controller may be initialized and loaded in the pre-EFI initialization (PEI) phase of the boot process when an exception or interrupt occurs.

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description. In addition, the components shown are not drawn to scale and information handling system 200 may include additional or fewer components. In addition, connections between components may be omitted for descriptive clarity.

Figure 3:
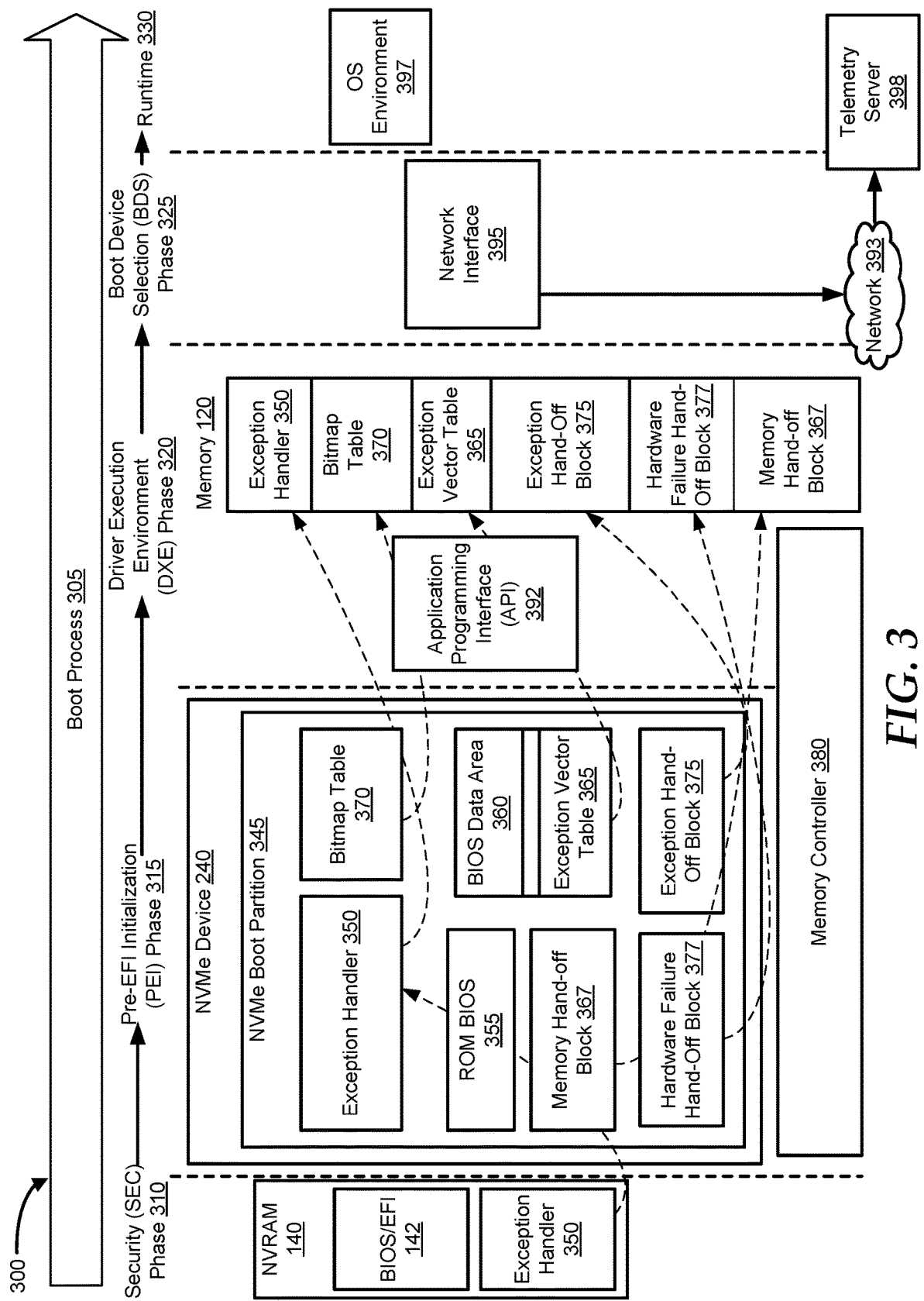
FIG. 3 is a block diagram illustrating an example of a boot process that can be performed on an information handling system for fault tolerance and debug analysis during a boot process, according to an embodiment of the present disclosure.

FIG. 3 illustrates an example of a phase diagram 300 of a boot process 305 of an information handling system, such as information handling system 200 for fault tolerance and debug analysis during the boot process. Boot process 305 is intended to encompass both conventional BIOS and UEFI boot processes but will be described primarily in the context of the UEFI boot process. Boot process 305 includes a security (SEC) phase 310, a PEI phase 315, a driver execution (DXE) phase 320, a boot device selection (BDS) phase 325, and a runtime 330. While embodiments of the present disclosure are described in terms of information handling system 200 of FIG. 2, it should be recognized that other systems may be utilized to perform the described function.

SEC phase 310 is the first phase of the boot process 305, wherein BIOS/EFI 142 stored in NV-RAM 140 handles restart event of information handling system 200 and temporarily allocates a portion of memory for use during the other boot phases. The NV-RAM 140 may be a serial peripheral interconnect (SPI) flash storage, which is commonly used to store a boot block or, in some cases, multiple boot blocks. For example, the NV-RAM 140 may store a primary boot block, such as the BIOS/EFI 142, and a secondary boot block. The boot block is the initial firmware that is loaded and executed when the computing system is powered on or resets.

During PEI phase 315, PEI modules or drivers are loaded to initialize low-level hardware such as system memory like memory 120. Additional UEFI services are also loaded and provide an interface for subsequent stages including DXE phase 320 in which the UEFI drivers are loaded to perform a variety of tasks. Boot process 305 will then transition to the BDS phase 325 where the advanced configuration and power interface (ACPI) table may be initialized which is used to describe the platform to the operating system. In addition, the GUID Partition Table (GPT), or Master Boot Record (MBR) is accessed to identify and load the operating system boot loader at a transient system load (TSL) phase. The TSL phase launches an operating system boot loader that will then load the operating system kernel and transfer control to the operating system environment 397 at runtime 330.

Because the boot process begins with the loading of BIOS/EFI 142, if the BIOS is corrupted, then the information handling system may fail to boot. Some recovery techniques are manual and not user-friendly and cause the information handling system to look for BIOS on a storage drive rather than in the NV-RAM 140. However, even if the information handling system can be booted from the BIOS stored in the storage drive, it may not be possible to correct the issue with the BIOS in the NV-RAM 140. In the present disclosure, when an exception or interrupt is detected during PEI phase 315, NVMe device 240 and a memory controller 380 may be initialized and loaded. Memory controller 380 may be configured to control access to NVMe devices by implementing or supporting the NVMe protocol. Exceptions occur when a processor detects an error condition while executing an instruction. Interrupts occur at random times during the execution of a program, in response to signals from hardware. Software and/or firmware can also generate interrupts.

When the exception or interrupt is detected, NVMe device 240 that includes an NVMe boot partition 345 may be loaded and initialized. NVMe boot partition 345 may be mapped as part of memory 120 even before memory 120 is installed during DXE phase 320. One or more resources may be loaded into NVMe boot partition 345 to handle the detected exception or interrupt. For example, ROM BIOS 355 may be a copy of BIOS/EFI 142 such that BIOS firmware exists in both NV-RAM 140 and NVMe boot partition 345. BIOS data area 360 may include data that ROM BIOS 355 may use during the boot process. One of skill in the art will recognize that an interrupt is a class of exception. Thus, when discussed in the specification and claims an exception includes an interrupt. As such, an interrupt handler is a class of exception handler.

NVMe boot partition 345 includes an exception handler 350, a ROM BIOS 355, a BIOS data area 360, a BIOS data area 360, an exception vector table, a bitmap table 370, an exception hand-off block 375, a memory hand-off block 367, and a hardware failure hand-off block 377. BIOS data area 360 includes an exception vector table 365 which may be configured to provide for exceptions or interrupt(s) for subsystems, such as a NIC in a communication subsystem, a timer, a keyboard, a mouse, a serial port, etc. during the PEI phase 315. Exception vector table 365 may be an interrupt or exception vector table which associates an interrupt or exception with a vector that is associated with an exception handler or an interrupt service routine. Exception vector table 365 also includes an index which may be a unique identifier associated with an exception or interrupt, wherein each index is mapped to one or more vectors. When responding to the exception or interrupt, the processor uses the index to determine the vector and corresponding exception handler or interrupt service routine. For example, when an interrupt occurs, an interrupt service routine to call may be found using the index and/or vector included in exception vector table 365. The exception handler or interrupt service routine may be used to resolve the exception at PEI phase 315 or DXE phase 320.

Exception hand-off block 375 may be generated during PEI phase 315 or DXE phase 320 and includes information associated with the detected exception or interrupt. The information in exception hand-off block 375 may also be used in re-initializing exception vector table 365 once memory 120 is detected, which is the system memory, in DXE phase 320. Exception hand-off block 375 may be copied to memory 120 along with bitmap table 370 once memory 120 is detected.

Hardware failure hand-off block 377 may include information that describes hardware associated with the detected exception or interrupt. For example, hardware failure hand-off block 377 may include information associated with the platform controller hub (PCH) devices such as device identifiers, error codes, etc. Hardware failure hand-off block 377 may also include PCIe logs with data associated with PCH devices with issues, wherein each PCH device that failed during the past and/or current boot process is added to the hardware failure hand-off block 377. Additional hardware details may be added to the hardware failure hand-off block 377 during the DXE phase 320. Memory hand-off block 367 may include information that describes a memory associated with the detected exception or interrupt. For example, memory hand-off block 367 may include information describing the memory configuration such as a base address of a page range.

Exception handler 350 may be configured to direct the operation in the event of an exception or interrupt. The exception may be associated with a particular argument that directs the exception handler 350 as to how to proceed in handling the exception, such as how to proceed in handling the exception. For example, the exception handler may proceed with failover and/or recovery process. In another example, the exception handler may be configured to direct a network controller to connect to the network and perform a representation state transfer (REST) API call.

Bitmap table 370 may be a matrix or a table data structure where each binary row represents an attribute that may be used in triaging the exception or interrupt. For example, each of the rows may represent an exception or interrupt identifier and each of the columns may represent how to remediate the exception or interrupt. Bitmap table 370 may also include a reason why the exception or interrupt failed. Bitmap table 370 may be loaded into the NVMe boot partition 345 from NV-RAM 140.

During DXE phase 320 when memory 120 is detected, one or more resources in the NVMe boot partition may be copied to memory 120. For example, exception handler 382, bitmap table 370, exception hand-off block 375, hardware failure hand-off block, memory hand-off block, and exception vector table 365 may be copied to memory 120 when it is detected. The exception vector table 365 may be re-initialized during the copy which can update the address of the exception handler associated with the vector. Once the aforementioned resources are copied to the system memory execution, execution of the function associated with the present disclosure may be performed using the resources in the system memory.

The information in one or more hand-off blocks such as hardware failure hand-off block 377, memory hand-off block 367, exception hand-off block 375, exception vector table 365, and bitmap table 370 may be used when triaging one or more exceptions and/or interrupts during the boot process. For example, the information may be used to determine an exception handler which may include using an API 392 to handle or resolve the exception or interrupt. API 392 may be one of various APIs such as WSMAN, REST, simple network management protocol (SNMP), remote access controller admin (RACADM), etc. The application programming interface may be associated with one or more functions at a remote server to mitigate, triage, and/or handle the exceptions and/or interrupts. When the execution of the handler is complete, the processor resumes the execution of the interrupted procedure or task. In one example, API 392 may be used to update or recover a driver for a PCIe device before continuing with boot process 305.

During BDS phase 325, a network interface 395 may connect with telemetry server 398 via a network 393 to transmit information associated with the exception or interrupt. Network 393 may be a public network, such as the Internet, a physical private network, a wireless network, a virtual private network (VPN), or any combination thereof. Telemetry server 398 may be configured to analyze telemetry data and other information from information handling system 200 and/or other information handling systems. Telemetry server 398 may be configured to transmit resolution instructions to the information handling system configured to implement the resolution associated with the exception or interrupt.

Although, the present disclosure utilizes NVMe boot partition in performing the functions disclosed herein, a cache as RAM may instead be used instead of the NVMe boot partition. For example, instead of the various resources such as exception handlers, hand-off blocks, bitmap tables, and/or exception vector table being loaded in the NVMe boot partition, these resources may instead be loaded into the cache as RAM. In addition, the present disclosure describes using the exception hand-off block, memory hand-off block, and hardware hand-off block the exception or interrupt detected may generate at least one or up to the three identified hand-off blocks in handling the exception or interrupt. However, generating more than three hand-off blocks to describe and handle the exception is inclusive of this disclosure as well as generating a hand-off block that includes information that is aggregated based on two or more hand-off blocks. For example, the exception hand-off block may include information that describes the memory or hardware, wherein the memory hand-off block and the hardware hand-off block may not be then generated.

Figure 4A:
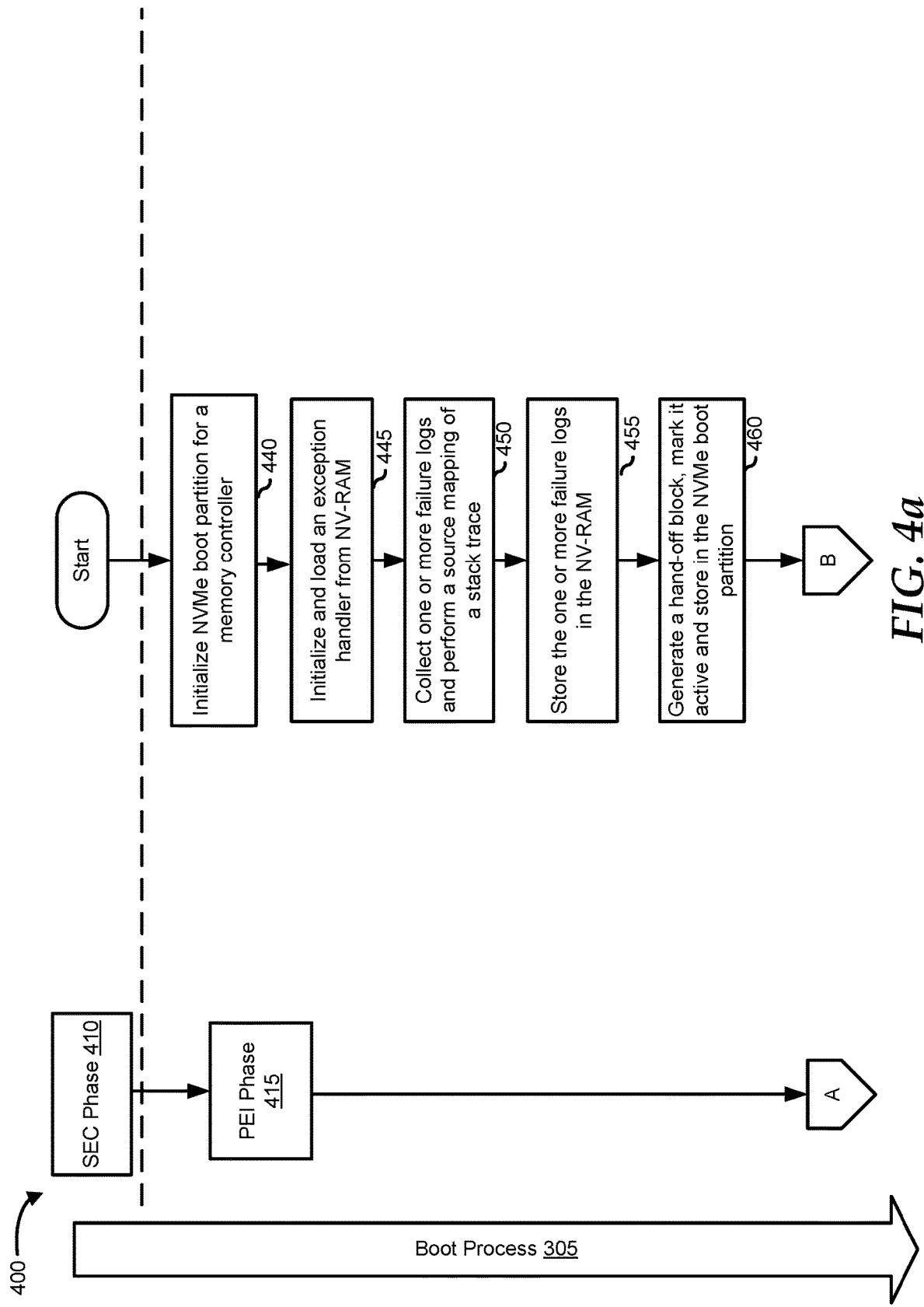
FIG. 4*a* and FIG. 4*b* are flowcharts illustrating an example of a method for fault tolerance and debug analysis during a boot process, according to an embodiment of the present disclosure.

FIG. 4a shows an example of a method 400 of a boot process 405 of an information handling system, such as information handling system 200 for fault tolerance and debug analysis during the boot process 405. Boot process 405 includes an SEC phase 410, a PEI phase 415, a DXE 420, a BDS phase 425, and a runtime 430. One of skill in the art will appreciate that this flowchart explains a typical example, which can be extended to advanced applications or services in practice.

Method 400 typically starts at block 440 when an interrupt or exception is detected and includes initializing an NVMe boot partition. The method proceeds to block 445 where one or more exception handlers are loaded and initialized. For example, the exception handler may be assigned a physical address range. The exception handler may be loaded from the SPI flash or NV-RAM based on a hardcoded address.

At block 450, the method collects one or more failure logs associated with the exception or interrupt and performs source mapping of the stack trace. The failure log may be stored in the NV-RAM at block 455. At block 460, the method may generate one or more hand-off blocks to describe the detected exception or interrupt. For example, the method may generate an exception hand-off block, a hardware failure hand-off block, a memory hand-off block, etc. The method may mark the hand-off block as active and store it in the NVMe boot partition until the system memory is detected during the DXE phase at which point the hand-off block may be copied to the system memory. If the exception or interrupt is associated with hardware, then the method may generate the hardware failure hand-off block to include information associated with the hardware associated with the exception or interrupt. In another example, instead of generating the hardware failure hand-off block, the method may aggregate the hardware information in the exception hand-off block.

Figure 4B:
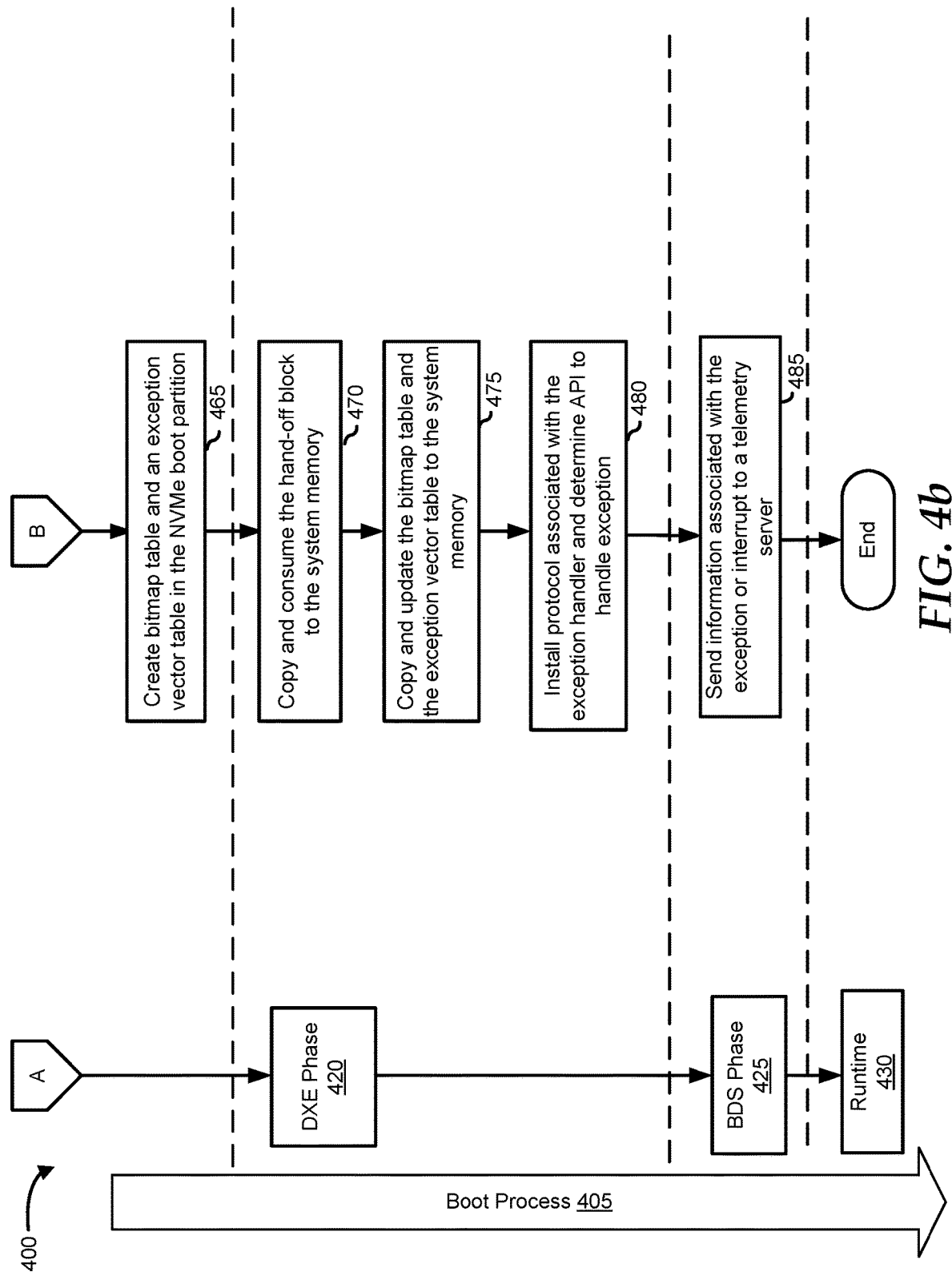

FIG. 4b shows a continuation of method 400 of FIG. 4a. At block 465, the method may create a bitmap table and an exception vector table in the NVMe boot partition. The bitmap table is associated with the exception or interrupt and its resolution. The exception vector table includes a vector that may be used in locating the exception handler or interrupt service routine to resolve the exception or interrupt. At block 470, the method may copy one or more hand-off blocks to the system memory when the system memory is detected and the address of the hand-off block may be updated accordingly. If the exception or interrupt is detected after the system memory is initialized, then the exception loader may be loaded to the system memory from the NV-RAM and the physical address range may be updated.

At block 475, the method may copy the bitmap table and the exception vector table to the system memory. The bitmap table and/or the exception vector table may be re-initialized based on the current address of the one or more hand-off blocks. At block 480, the method may install a protocol associated with the exception handler or interrupt service routine and determine an application programming interface (API), such as a representational state transfer (REST) API that may be used to handle the exception. A parameter in the API may be used to specify a method or function to call which may handle or resolve the exception or interrupt. For example, the function may update a firmware associated with a driver, wherein after updating the firmware boot process 405 may continue. At block 485, the method may send one or more failure logs to a telemetry server. The method may also transmit information from the exception hand-off block, the hardware failure hand-off block, and/or the memory hand-off block. The telemetry server may include tools to record and analyze the information received about the information handling system. The information may be used in the improvement of exception handling during the boot process.

Figure 5:
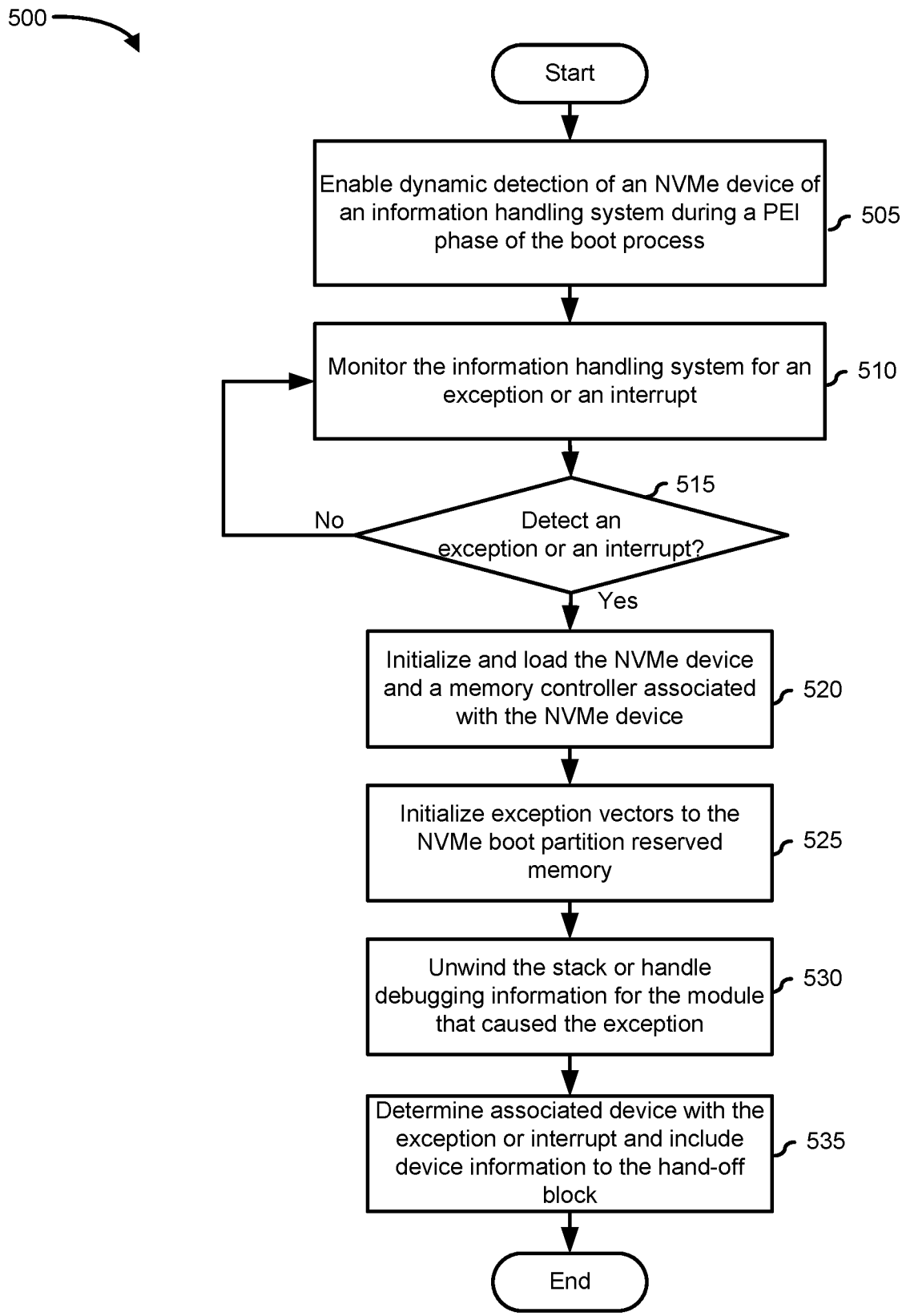
FIG. 5 is a flowchart illustrating an example of a method for fault tolerance and debug analysis during a boot process, according to an embodiment of the present disclosure.

FIG. 5 shows an example of a method 500 of a boot process of an information handling system for fault tolerance and debug analysis during the boot process. Method 500 is typically performed during the boot process such as of information handling system 200 of FIG. 2. One of skill in the art will appreciate that this flowchart explains a typical example, which can be extended to advanced applications or services in practice.

Method 500 typically starts at block 505 where the method enables a dynamic detection of an NVMe device at the early stage of a boot process, such as the PEI phase. The method may map the NVMe boot partition as part of the system memory even before the system memory is detected and installed at the DXE phase.

At block 510, the method monitors the information handling system for an interrupt and/or an exception. At decision block 515, the method determines whether it detects an interrupt or an exception. If the method detects an interrupt and/or an exception, then the "YES" branch is taken and the method proceeds to block 520. If the method does not detect an interrupt or an exception, then the method proceeds to block 510.

At block 520, the method initializes and loads an NVMe device and a memory controller associated with the NVMe device. At block 525, the method may initialize one or more exception and/or interrupt vectors to the NVMe boot partition reserved memory region. The exception or interrupt vectors may be associated with one or more exception or interrupt handlers via an exception or interrupt vector table. When the exception such as illegal operation code, division error, overflows error, etc. occur, the method may save the current status of the exception in a hand-off block. The method may later locate the exception or interrupt handler according to the exception or interrupt vector table. The exception or interrupt handler may be located at a fixed memory address located at the lower region of the NV-RAM and copied to the NVMe booth partition during the PEI phase. If the exception or interrupt occurred during the DXE phase, the exception or interrupt handler may be copied to the system memory.

At block 530, the method may unwind the stack trace to determine the cause of the exception or interrupt and its identifier. Based on an exception or interrupt identifier, the method may use the exception or interrupt vector table to find the exception or interrupt handler associated with the vector that is mapped to the exception or interrupt identifier. The method may unwind the stack trace using the functions epilogue and prologue to walk through the extended stack pointer. At block 535, the method may also determine whether the exception or interrupt is hardware related and if so may generate information associated with the hardware to a hand-off block. For example, the exception or interrupt may be related to one or more PCIe devices.

Figure 6:
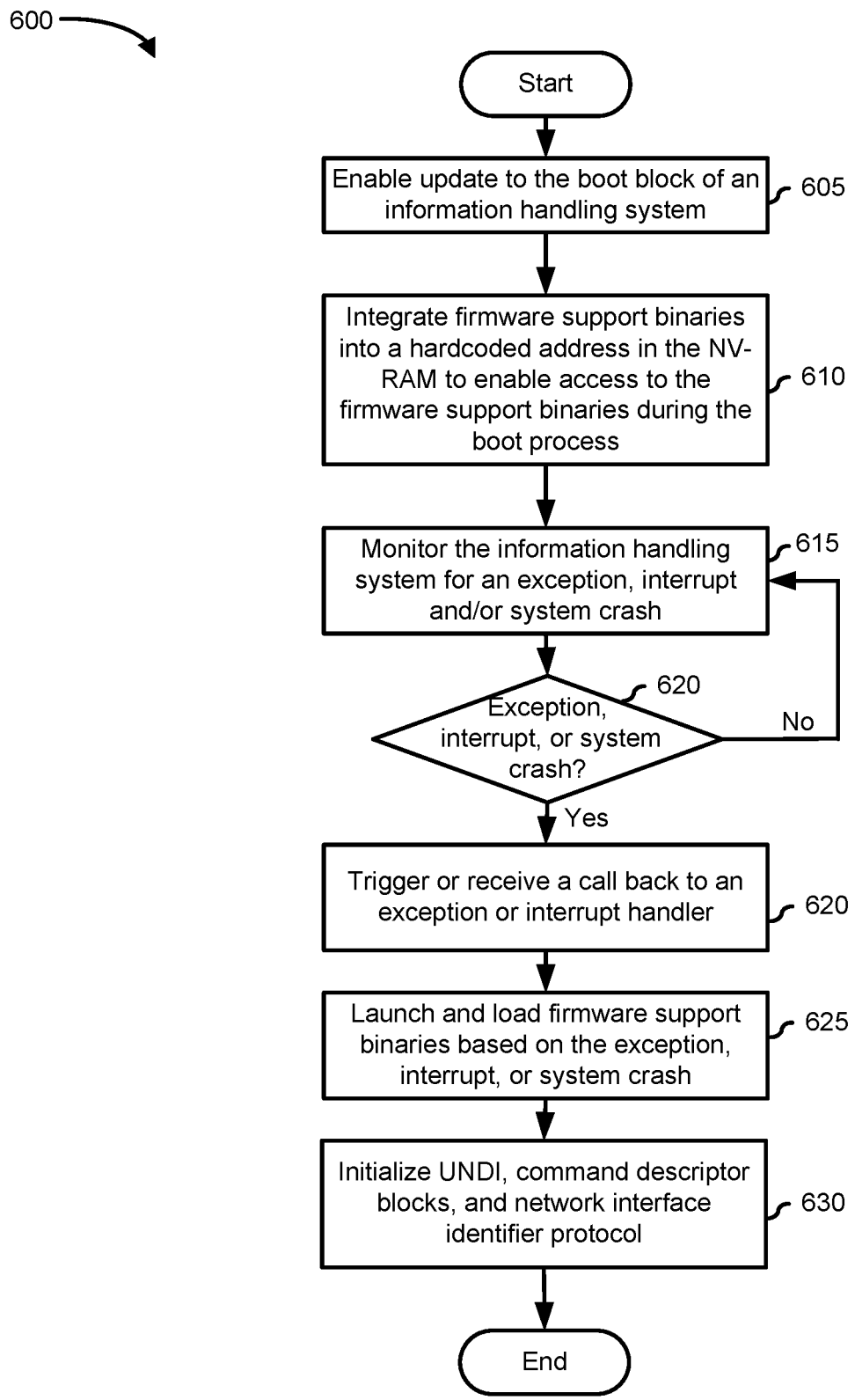
FIG. 6 is a flowchart illustrating an example of a method for fault tolerance and debug analysis during a boot process, according to an embodiment of the present disclosure.

FIG. 6 shows an example of a method 600 of a boot process of an information handling system for fault tolerance and debug analysis during the boot process. Method 600 is typically performed during the boot process of information handling system 200 of FIG. 2. One of skill in the art will appreciate that this flowchart explains a typical example, which can be extended to advanced applications or services in practice.

Method 600 typically starts at block 605 where access to the boot block is enabled. For example, the top-block swap bit may be executed by swapping the top block with another location to allow the update to the boot block. At block 610, firmware support binaries, such as firmware support package (FSP) of Intel® and platform security processor (PSP) of Advanced Micro Devices® (AMD) that provide support to the BIOS firmware are integrated into a hardcoded address of the bootloader in the NV-RAM. This enables access to the firmware support binaries during the PEI phase and the DXE phase. The firmware support binaries may be used by the exception or interrupt handler to resolve or handle and process exceptions and/or interrupts during the boot process.

At block 615, the method monitors the information handling system for an exception, interrupt, or system crash. At block 620, the method determines whether there is an exception, interrupt, or system crash. If the method determines that an exception, interrupt, or system crash occurred, then the "YES" branch is taken and the method proceeds to block 620. If the system does not crash or no exception or interrupt occurred, then the "NO" branch is taken and the method proceeds to block 615.

At block 620, an exception or interrupt handler such as a red screen of death (RSOD) handler may be triggered and receive a callback-based on an exception or interrupt vector associated with the exception or interrupt. At block 625, the exception or interrupt handler may launch and load the firmware support binaries based on the exception, interrupt, or system crash. The firmware support binaries may be loaded from the NV-RAM address space and/or the EFI system partition. The firmware support binaries may also be loaded from the NVMe boot partition and/or system memory.

At block 630, the exception or interrupt handler may initialize the universal network device interface (UNDI), command descriptor blocks (CDBs), and a network interface identifier (NII). The method may also download protocol to initiate communication over the network. After initialization, the exception or interrupt handler may initiate network communication, download, and download firmware support binaries. The firmware support binaries downloaded may be based on the exception or interrupt. In one example, the method may download tools to perform root cause analysis. In another example, the method may update or recover a firmware associated with the exception or interrupt like updating or recovering a device driver.

Figure 7:
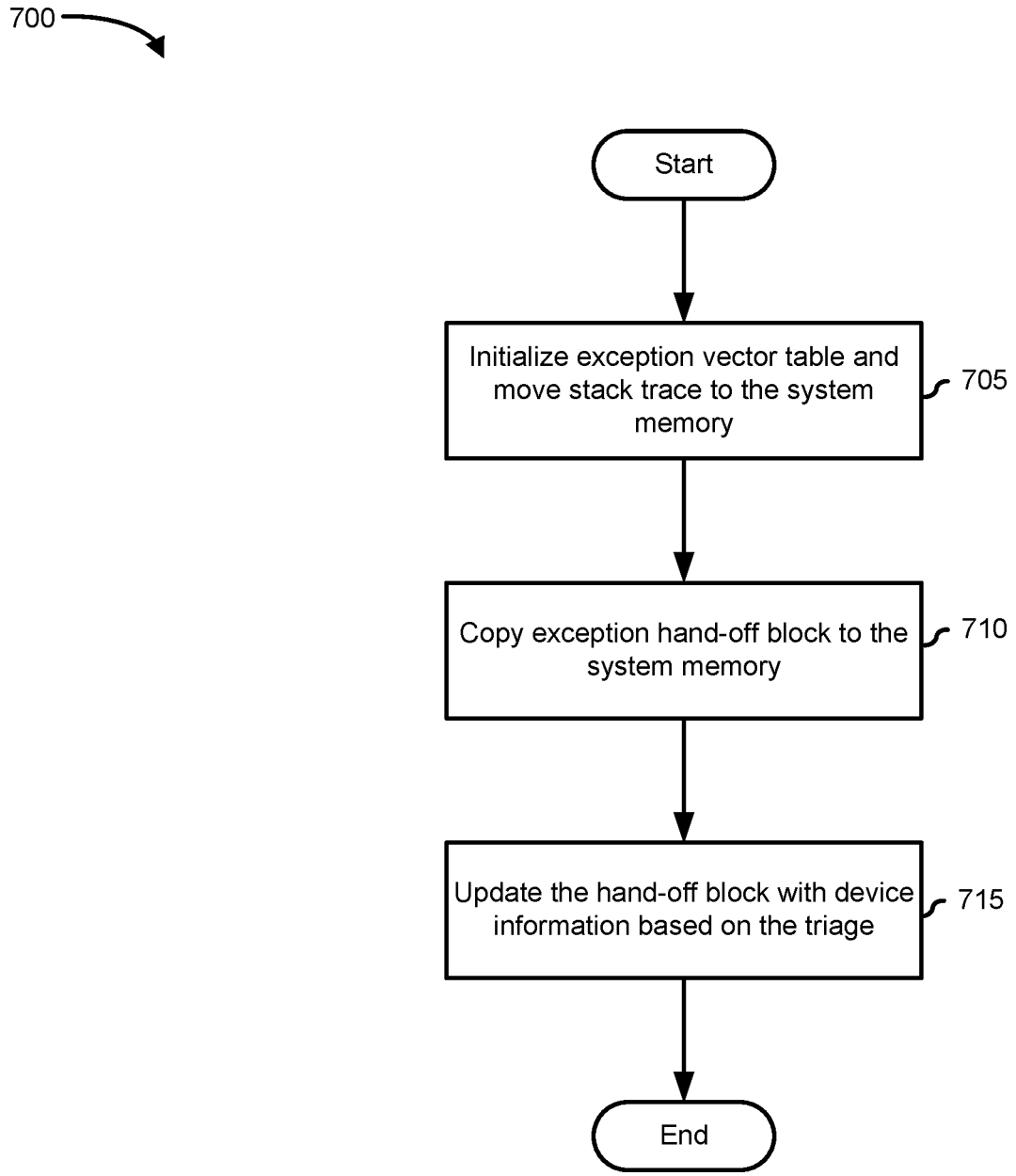
FIG. 7 is a flowchart illustrating an example of a method for fault tolerance and debug analysis during a boot process, according to an embodiment of the present disclosure.

FIG. 7 shows an example of a method 700 of a boot process of an information handling system for fault tolerance and debug analysis during the boot process. Method 700 is typically performed by information handling system 200 of FIG. 2. One of skill in the art will appreciate that this flowchart explains a typical example, which can be extended to advanced applications or services in practice.

Method 700 typically starts at block 705 when after detecting the system memory the exception vector table is copied to the system memory and re-initialized. In addition, the stack trace may also be moved to the system memory. At block 710, one or more hand-off blocks in the NVMe boot partition are copied to or generated at the system memory. Information in the exception hand-off block is consumed and the triage of the exception or interrupt is continued. At block 715, the hand-off block, such as the exception hand-off block or hardware failure hand-off block in the system memory may be updated with additional information gathered during the triage.

Although FIG. 5, FIG. 6, and FIG. 7 show example blocks of method 500, method 600, and method 400 in some implementation, method 500, method 600, and method 700 may include additional blocks, fewer blocks, different blocks, or differently arranged blocks than those depicted in FIG. 5, FIG. 6, and FIG. 7. Those skilled in the art will understand that the principles presented herein may be implemented in any suitably arranged processing system. Additionally, or alternatively, two or more of the blocks of method 500, method 600, and method 700 may be performed in parallel. For example, blocks 520 and 525 of method 500 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   in response to detecting an exception during a pre-extensible firmware interface phase of a boot process, creating, by a processor, a hand-off block in a non-volatile memory express (NVMe) boot partition;
   updating the hand-off block with information associated with the exception;
   loading an exception vector table to the NVMe boot partition, wherein the exception vector table includes an index associated with the exception, wherein the index is mapped to a vector associated with an exception handler; and loading the exception handler to the NVMe boot partition, wherein the exception handler is used to resolve the exception.

2. The method of claim 1, further comprising loading a bitmap table to the NVMe boot partition from a non-volatile random access memory.

3. The method of claim 1, further comprising in response to detecting a system memory during a driver execution environment phase of the boot process, copying a bitmap table from the NVMe boot partition to the system memory.

4. The method of claim 1, further comprising in response to detecting a system memory during a driver execution environment phase of the boot process, copying the hand-off block from the NVMe boot partition to the system memory.

5. The method of claim 1, further comprising updating a hardware failure hand-off block with hardware information associated with the exception.

6. The method of claim 1, further comprising collecting a failure log associated with the exception.

7. The method of claim 6, further comprising sending the failure log to a telemetry server.

8. The method of claim 1, further comprising installing a protocol associated with the exception handler.

9. An information handling system, comprising:
a non-volatile memory express (NVMe) device; and
a processor configured to:
in response to detecting an exception, create a hand-off block in an NVMe boot partition in the NVMe device during a pre-extensible firmware interface phase of a boot process;
update the hand-off block with information associated with the exception;
load an exception table to the NVMe boot partition, wherein the exception table includes an index associated with the exception that is mapped to a vector associated with an exception handler; and
load the exception handler to the NVMe boot partition, wherein the exception handler resolves the exception.

10. The information handling system of claim 9, the processor is further configured to: in response to detecting a system memory during a driver execution environment phase of the boot process, copy a bitmap table from the NVMe boot partition to the system memory.

11. The information handling system of claim 9, the processor is further configured to: in response to detecting a system memory during a driver execution environment phase of the boot process, copy the hand-off block from the NVMe boot partition to the system memory.

12. The information handling system of claim 9, further comprising updating a hardware failure hand-off block with hardware information associated with the exception.

13. The information handling system of claim 9, wherein the processor is further configured to collect a failure log associated with the exception.

14. A non-transitory computer-readable medium including code that when executed performs a method, the method comprising:
in response to detecting an exception, creating a hand-off block in a non-volatile memory express (NVMe) boot partition during a pre-extensible firmware interface phase of a boot process;
updating the hand-off block with information associated with the exception;
loading an exception table to the NVMe boot partition, wherein the exception table includes an index associated with the exception and a vector associated with an exception handler; and
loading the exception handler to the NVMe boot partition, wherein the exception handler resolves the exception.

15. The non-transitory computer-readable medium of claim 14, further comprising in response to detecting a system memory during a driver execution environment phase of the boot process, copying a bitmap table from the NVMe boot partition to the system memory.

16. The non-transitory computer-readable medium of claim 14, further comprising in response to detecting a system memory during a driver execution environment phase of the boot process, copying the hand-off block from the NVMe boot partition to the system memory.

17. The non-transitory computer-readable medium of claim 14, further comprising loading a bitmap table to the NVMe boot partition from a non-volatile random access memory.

18. The non-transitory computer-readable medium of claim 14, further comprising collecting a failure log associated with the exception.

19. The non-transitory computer-readable medium of claim 18, further comprising sending the failure log to a telemetry server.

20. The non-transitory computer-readable medium of claim 14, further comprising installing a protocol associated with the exception handler.

* * * * *